United States Patent [19]

Sannino

[11] Patent Number: 5,784,367
[45] Date of Patent: Jul. 21, 1998

[54] METHOD AND DEVICE FOR COMMUNICATIONS BETWEEN PLURAL TERMINALS, COMPATIBLE WITH THE ARINC 629 STANDARD

[75] Inventor: Christian Sannino, Vielle Eglise en Yvelines, France

[73] Assignee: Sextant Avionique, Velizy Villacoublay, France

[21] Appl. No.: 627,476

[22] Filed: Apr. 4, 1996

[30] Foreign Application Priority Data

Apr. 7, 1995 [FR] France .................. 95 04301

[51] Int. Cl.$^6$ ........................................ H04L 12/56
[52] U.S. Cl. ........................................ 370/360; 370/392
[58] Field of Search ........................ 370/352, 355, 370/357, 360, 361, 362, 364, 365, 379, 382, 386, 389, 392, 400, 402

[56] References Cited

U.S. PATENT DOCUMENTS

| | | | |
|---|---|---|---|
| 4,862,451 | 8/1989 | Close et al. | 370/364 |
| 4,975,901 | 12/1990 | Poli | 370/360 |
| 5,144,619 | 9/1992 | Munter | 370/353 |
| 5,247,620 | 9/1993 | Fukuzawa et al. | 370/402 |
| 5,315,595 | 5/1994 | Allouis et al. | 370/421 |
| 5,321,691 | 6/1994 | Pashan | 370/395 |
| 5,408,469 | 4/1995 | Opher et al. | 370/397 |
| 5,436,886 | 7/1995 | McGill | 370/219 |
| 5,502,718 | 3/1996 | Lane et al. | 370/402 |
| 5,521,915 | 5/1996 | Dieudonne et al. | 370/395 |
| 5,546,392 | 8/1996 | Boal et al. | 370/395 |

OTHER PUBLICATIONS

Hoyme et al, ARINC 629 and SAFEbus: Data Buses for Commercial Aircraft, Scientfic Honeyweller vol. 11, No. 1, pp. 57–70, 1991.

Jean–Yves Le Boudec, The Asynchronous Transfer Mode: a tutorial, Computer Networks and ISDN Systems, vol. 24, No. 4, pp. 279–209, 1992.

*Primary Examiner*—Alpus H. Hsu
*Assistant Examiner*—Kwang B. Yao
*Attorney, Agent, or Firm*—Browdy and Neimark

[57] ABSTRACT

For the transfer of digital data between plural terminals, the method according to the invention comprises the connection of each terminal to a switching device via a respective bus of the ARINC 629 type, the switching device selectively ensuring communication between said buses; the shaping of the digital data to be transmitted by a terminal into at least one message of predefined fixed length, in which the digital data are associated with a header comprising a code identifying the message; the transmission of said message by the terminal on the bus connecting it to the switching device; the reception of the message by the switching device; and the transmission of the message by the switching device onto each of the buses connected to the destination terminals determined by means of the message identification code.

5 Claims, 3 Drawing Sheets

METHOD AND DEVICE FOR COMMUNICATIONS BETWEEN PLURAL TERMINALS, COMPATIBLE WITH THE ARINC 629 STANDARD

BACKGROUND OF THE INVENTION

1. Field of the Invention This invention relates to a method and device for communications compatible with the aeronautical ARINC 629 standard. It applies notably, though not exclusively, to the establishing of communication links between plural terminals installed on board an aerodyne and interconnected by an electric or optical bus.

The ARINC 629 standard specifies an algorithm used by each terminal to access the bus, and a message format for the transmission of the data via the bus, each message comprising a data zone preceded by a header enabling identification of the type and contents of the data grouped together in the data zone of variable size as a function of the volume of data to be transmitted.

According to this standard, the total available passband, which is limited to two Mbits/s, is shared by all the terminals connected to the bus, to the extent that the more terminals there are to be connected to the bus, the more the average passband attributed to each terminal is reduced.

2. Description of the Prior Art To increase the data thruput, it has been envisaged that the terminals be interconnected by means of several ARINC 629 buses. However, this result requires the production of coupling interfaces between each terminal and each bus capable of simultaneously accessing the buses for reception, and for transmission, the application of an algorithm to select the bus on which to transmit the message. Such an interface is therefore of a complexity which increases with the number of buses used. As a result, it is more expensive, and all the more so that it must be multiplied by the number of terminals to be interconnected.

Furthermore, there is a technique for the asynchronous transfer of digital data by switched network called ATM (Asynchronous Transfer Mode), based on the switching of data units called cells, of fixed size. According to this technique, the flow of cells from a terminal, destined for one or more terminals, constitutes a logic connection called "virtual channel". Each cell contains a header in which a virtual channel number is included, as well as a data field, each cell being transmitted by time division multiplexing on the transmission links. To do so, the network comprises cell switching devices whose main function is to distribute the cells they receive towards their destinations, and therefore to ensure the establishing of the virtual channels.

The cells come in just one single format, which enables material production that is therefore very fast, of the cell switching device.

OBJECT OF THE INVENTION

The main object of this invention is to apply the ATM technique to ensure communications in compliance with the ARINC 629 standard between plural terminals.

SUMMARY OF THE INVENTION

Accordingly, there is provided a method for the transfer of digital data between plural terminals.

This method is characterized in that it comprises the connection of each terminal to a switching device via a respective bus of the multitransmitter, multireceiver, multiplexed type, each bus being connected to a single terminal and to the switching device which selectively ensures communication between said buses, said process further comprising, during the transmission of digital data by a terminal to at least one destination terminal:

the shaping of the digital data into at least one message of predefined fixed length, in which the digital data are associated with a header comprising a code identifying the message, the transmission of said message by the terminal onto the bus connecting it to the switching device, the reception of the message by the switching device, the reading of the message identification code and the determination, by means of the identification code, of the destination terminals of the message, and the transmission of the message by the switching device onto each of the buses connected to the destination terminals.

In this way, each terminal fully avails of the maximum thruput offered by each bus. Furthermore, current switching technology regularly enables a switching power of the order of 1 Gbits/s to be obtained. Utilization of the switching device does not therefore reduce the available transmission rate at each terminal, when the buses are of the ARINC 629type.

In addition, this process enables the use of existing terminals equipped with coupling circuits for ARINC 629 buses, without any need to make hardware modifications to them. The only modifications to be made are purely software modifications and are intended to reorganize the messages in order for them to be of fixed size.

This method also has the advantage of being easily upgraded. In fact, the format of the messages is independent of the hardware structure of the buses and communications protocols used.

According to one feature of the invention, each terminal susceptible of transmitting and receiving messages is connected to the switching device by two buses, one being used for transmission and the other for reception.

Thus, each terminal avails of the maximum thruput of the bus for both transmission and reception.

According to another feature of the invention, each terminal is connected by two respective buses to two redundant switching devices, each message transmitted by a terminal being transmitted to the two switching devices.

It is thus possible to detect failures in the switching devices.

Such a switching device can be produced along the model of the switches used by the ATM technique, the coupling with the buses being achieved by means of interfacing circuits specific to the type of bus employed.

BRIEF DESCRIPTION OF THE DRAWINGS

Further features and advantages of the invention will be apparent from an embodiment of the device according to the method of the invention described, by way of a non-limiting example, in reference to the corresponding accompanying drawings in which.

DESCRIPTION OF THE PREFERRED EMBODIMENTS

Figure 1:
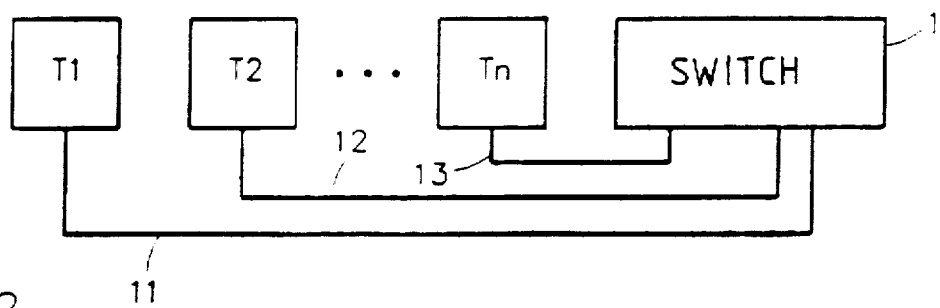
FIGS. 1 to 3 schematically illustrate three network architectures interconnecting plural terminals according to the invention.

FIG. 1 shows a plurality of terminals T1, T2 ... Tn each connected by a respective bus 11, 12, 13 to a switching device 1. The terminals represent e.g. the different computers and electronic equipment taken on board an aerodyne.

The buses 11, 12, 13 are of the multitransmitter, multireceiver, multiplexed type, e.g. of the ARINC 629 type, and are simply connected to two transmitters/receivers, i.e. a terminal T1, T2, Tn and the switching device 1.

Thus, in the case of an ARINC 629 bus, each terminal has a thruput of 2 Mbits/s in order to communicate with the others.

Figure 2:
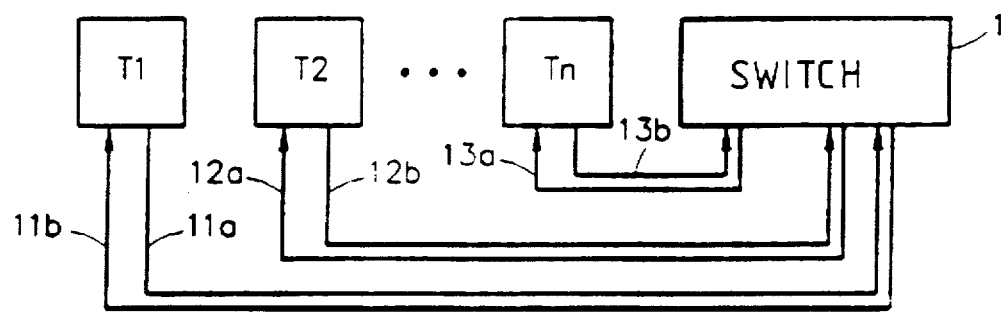

If an increase of this thruput is required, each bus can be doubled up as represented in FIG. 2 so that each terminal T1, T2, Tn is connected to the switching device 1 via a bus 11a, 12a, 13a assigned to the transmission of messages, and a bus 11b, 12b, 13b assigned to reception.

Of course, if a terminal T1, T2, Tn needs a higher thruput, it can be assigned more ARINC 629 buses.

Figure 3:
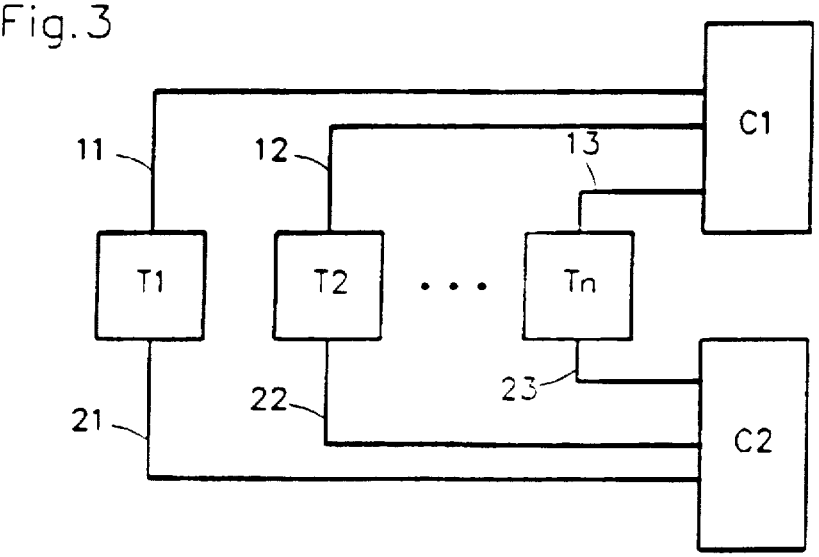

It appears clearly in FIGS. 1 and 2 that the switching device 1 is the weak point of this architecture. To obviate this drawback, it is possible, as shown in FIG. 3, to use two redundant switching devices C1 and C2, each being connected by a respective bus 11 to 13 and 21 to 23, to each of the terminals T1, T2, Tn. Each terminal must then compare the messages received by the two buses respectively connected to the two switching devices C1, C2, a difference between these messages revealing a transmission fault.

The architecture shown in FIG. 1 or 2 can also be trebled, by using three switching devices to ensure the communications between the terminals, even in the event of failure of one of the switching devices.

Figure 4:
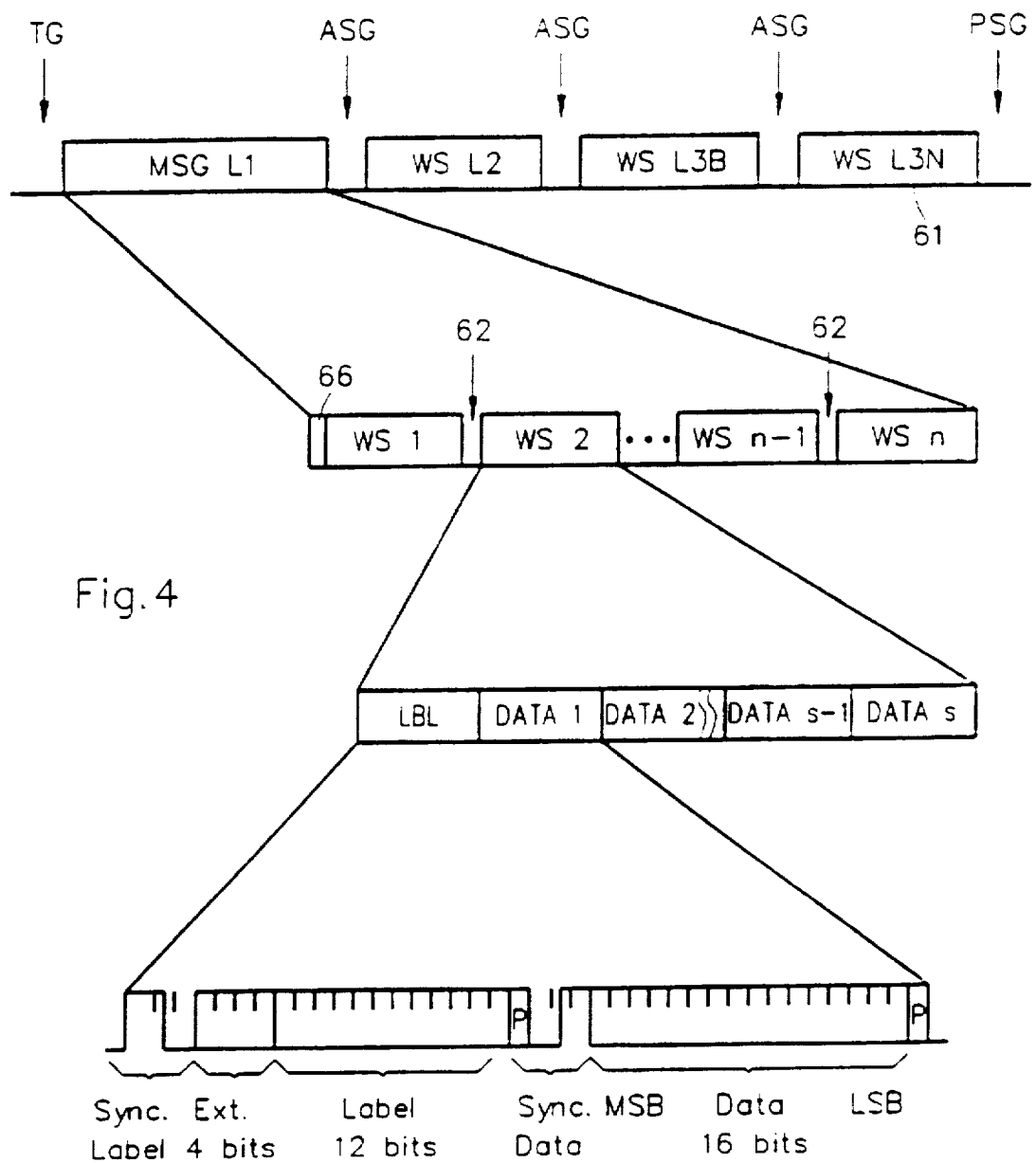
FIG. 4 shows the format of the messages exchanged.

FIG. 4 illustrates the principle for constructing messages according to the ARINC 629 standard. These messages are grouped into periodic frames of predefined constant duration TI comprising a periodic message Li of predefined variable size, by a terminal connected to the bus in question, completed or not by one to three messages L2, L3B and L3N, as a function of the space remaining unoccupied by the message L1 in the frame 61. The messages L2, L3B and L3N are therefore not transmitted periodically.

The messages L2, L3B and L3N are separated by a time interval ASG indicating the end of a message and the start of the next one, the frames 61 being marked by means of a time interval PSG.

Each message Li is constituted by a synchronization datum 66, followed by a succession of 1 to 31 word strings WS 1 to WS n, separated by an interval 62. The messages L2, L3B and L3N are constituted by a single word string.

Each word string WSi is constituted by a succession of 20-bit words, comprising a label word LBL stating information concerning the message transmitter and contents thereof, followed by 1 to 256 data words DATA 1 to DATA S, the first data word DATA 1 indicating the number of data words in the word string WSi. A label word LBL comprises 3 synchronization bits, 4 extension bits enabling the message transmitter to be identified, 12 bits identifying the message and a parity bit P. The data words comprise 3 synchronization bits, followed by 16 data bits and 1 parity bit P.

To simplify the switching of the messages, the size of the word strings WSi is fixed to a predetermined value for all the terminals T1, T2, Tn. Thus, each word string WSi is constituted by a label giving information on the contents, the transmitter and the destination of the word string, and a field containing a fixed number of data words to be transmitted. The word strings WSi thus become comparable to the cells used by the ATM technique for asynchronous transfer of digital data, the label of the word string serving to direct the associated digital data to the destinations.

Figure 5:
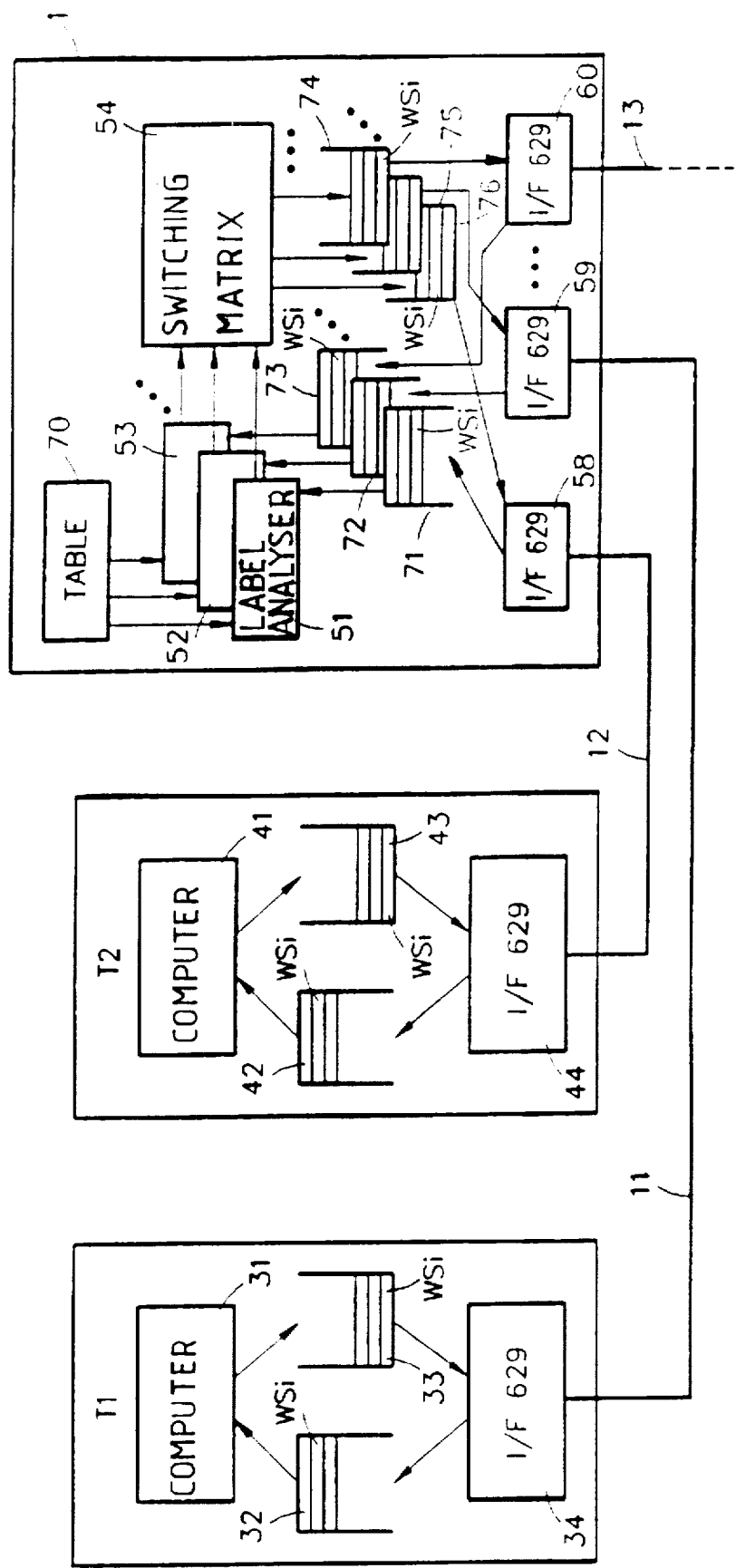
FIG. 5 illustrates the process for transmission of a message between two terminals.

Such as represented in FIG. 5, each terminal Ti, T2 comprises a computer 31, 41, two exchange memories, e.g. of the FIFO type, i.e. a transmission exchange memory 32, 42 and a reception exchange memory 33, 43 in which are respectively stored the word strings or messages WSi transmitted by the computer 31, 41 and the messages received, destined for the computer.

Each terminal Ti, T2 also comprises a coupling circuit 33, 44, connected to the ARINC 629 type bus 11, 12 associated with the terminal, which transfers the messages WSi between the exchange memories 32, 33, 42, 43 and the bus 11, 12.

Thus, for example, each message WSi transmitted by the computer 31 is stored in the exchange memory 33, then transferred by the coupling circuit 34 onto the bus 11 destined for the switching device 1 designed to retransmit the messages received towards their destinations.

To this end, the switching circuit 1 comprises:

- a circuit for coupling 58, 59, 60 by bus 11, 12, 13 to which the switching device 1 is connected,
- a FIFO type reception exchange memory 71 in which are stacked the messages WSi circulating on the bus 11, 12, 13 and transferred by the coupling circuits 58, 59, 60,
- as many FIFO type transmission exchange memories 74, 75, 76 as there are buses to which the switching i device is connected, and in which are stacked the messages WSi to be retransmitted onto at least one of the buses 11, 12, 13,
- a label analyzing device 51 designed to successively analyze the labels LBL of the messages WSi situated in the reception exchange memory 71 and to attach routing data thereto, and
- a switching matrix 54 which receives the messages WSi transmitted by the label analyzing device 51 and which uses the routing data associated with each message WSi in order to determine to which transmission exchange memories 74, 75, 76 the message is to be transferred.

The messages WSi stacked up in the transmission exchange memories 74, 75, 76 are then transferred on the corresponding bus 11, 12, 13 by the corresponding coupling circuit 58, 59, 60.

Then, the messages WSi retransmitted by the coupling device 1, circulating e.g. on the bus 12, are transferred by the coupling circuit 44 into the reception exchange memory 43, and are thus made available to the computer 41.

It should be noted that, according to the ARINC 629 standard, each message transmitted by one of the coupling circuits 34, 44, 58, 59, 60 on the buses 11, 12, 13 is simultaneously received by this same circuit which compares the message received with the message transmitted and emits an error signal in the event of a difference being detected. This arrangement enables transmission errors to be detected.

The label analyzing devices 51, 52, 53 can e.g. be associated with a table 30 enabling the correspondence to be established between the labels of all the messages WSi susceptible of being received by the switching device 1, and routing data usable by the switching matrix 54.

This correspondence table 30 is memorized by a non-volatile memory e.g. of the EEPROM type, and is associated with a remote uploading means enabling the table to be loaded, when the switching device 1 is initialized, or when the list of messages exchanged by the terminals Ti, T2, Tn is modified.

In order to provide a higher switching speed, the coupling device 1 comprises as many reception exchange memories 71, 72, 73 and as many label analyzing devices 51, 52, 53 as there are buses 11, 12, 13, each reception exchange memory 71, 72, 73 being connected on the one hand to a respective coupling circuit 58, 59, 60, and on the other hand to a respective label analyzing device 51, 52, 53. Furthermore, the switching matrix 54 comprises as many inputs as there are label analyzing devices 51, 52, 53. In this way, the messages WSi transmitted towards the switching device 1 by the different buses 11, 12, 13 can be processed in parallel.

Figure 6:
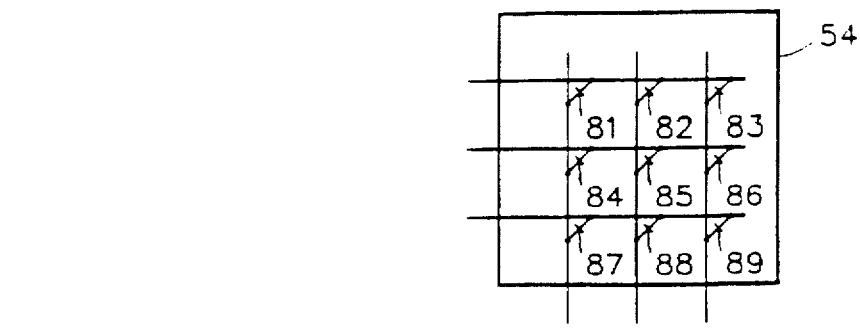
FIG. 6 schematically represents a switching matrix used by the switching device to orient the messages received.

The switching matrix 54 can be produced according to the switching technique used in the field of telecommunications, e.g. like the one schematically represented in FIG. 6.

In this figure, the switching matrix 54 comprises three inputs and three outputs, each of these inputs being interconnected with each of the three outputs, by means of three switches 81 to 89 commanded independently of one another by the routing information associated with each message WSi to be transferred.

I claim:

1. A device for transmitting digital data between a plurality of terminals, comprising a switching device and a plurality of buses of the multitransmitter, multireceiver, multiplexed type respectively connecting said terminals to said switching device, said digital data being transmitted onto said buses in messages of predefined fixed length, each message including a header comprising a code identifying the message, said switching device comprising:

coupling circuits respectively connected to said buses, each coupling circuit being designed to transfer the messages received by said switching device from said terminals between the respective bus and said switching device, at least one reception exchange memory into which the coupling circuits transfer all the messages transmitted on said buses by said terminals, at least one label analyzing device designed to successively read the identification code of each message stored in the reception exchange memory and to attach thereto routing information as a function of the identification code read in the message, as many transmission exchange memories as there are buses, in which are stored the messages to be transferred on said buses by said coupling circuits, a switching matrix designed to transfer each message from said reception exchange memory into at least one transmission exchange memory as a function of the routing information associated with said message.

2. The device as claimed in claim 1, wherein the switching device comprises as many reception exchange memories and label analyzing devices as there are buses, each reception exchange memory being connected to one respective bus via a coupling circuit, and to a respective label analyzing device, each label analyzing device being connected to a respective input of the switching matrix and having access to a table providing the routing information of each message as a function of the identification code of the message.

3. The device as claimed in claim 1, wherein the label analyzing device uses a table establishing correspondence between the identification codes of all the messages susceptible of being received by the switching device and the routing information usable by the switching matrix.

4. The device as claimed in claim 1, wherein each of the coupling circuits comprises means for simultaneously receiving a message when transmitted by the coupling circuit and means for comparing the message transmitted with the message simultaneously received, and means for generating an error signal when said comparing means detect a difference.

5. The device as claimed in claim 1, wherein the transmission and reception exchange memories are of the FIFO type.

* * * * *